United States Patent
Kim et al.

(10) Patent No.: US 8,693,787 B2
(45) Date of Patent: Apr. 8, 2014

(54) METHOD AND SYSTEM FOR GENERATING DATA USING A MOBILE DEVICE WITH A PROJECTION FUNCTION

(75) Inventors: Hee Woon Kim, Suwon-si (KR); Si Hak Jang, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 529 days.

(21) Appl. No.: 12/945,070

(22) Filed: Nov. 12, 2010

(65) Prior Publication Data

US 2011/0149101 A1 Jun. 23, 2011

(30) Foreign Application Priority Data

Dec. 18, 2009 (KR) .................. 10-2009-0126564

(51) Int. Cl.
- *G06K 9/52* (2006.01)
- *G06T 7/00* (2006.01)
- *G06T 3/00* (2006.01)
- *H04N 9/31* (2006.01)
- *H04N 5/74* (2006.01)

(52) U.S. Cl.
CPC ............. *G06T 7/004* (2013.01); *G06T 3/005* (2013.01); *G06T 7/0022* (2013.01); *H04N 9/3176* (2013.01); *H04N 9/3179* (2013.01); *H04N 5/7408* (2013.01)
USPC ........................................ 382/206; 382/294

(58) Field of Classification Search
USPC .................................................. 382/206, 294
See application file for complete search history.

(56) References Cited

U.S. PATENT DOCUMENTS

| | | | | |
|---|---|---|---|---|
| 5,502,459 A | * | 3/1996 | Marshall et al. | 345/158 |
| 5,515,079 A | * | 5/1996 | Hauck | 345/157 |
| 5,572,251 A | * | 11/1996 | Ogawa | 348/207.99 |
| 5,914,783 A | * | 6/1999 | Barrus | 356/614 |
| 6,050,690 A | * | 4/2000 | Shaffer et al. | 353/122 |
| 6,275,214 B1 | * | 8/2001 | Hansen | 345/158 |
| 6,323,839 B1 | * | 11/2001 | Fukuda et al. | 345/157 |
| 6,802,611 B2 | * | 10/2004 | Chu et al. | 353/28 |
| 6,970,600 B2 | * | 11/2005 | Abe | 382/187 |
| 7,091,949 B2 | * | 8/2006 | Hansen | 345/158 |
| 7,176,890 B2 | * | 2/2007 | Kitaguchi et al. | 345/158 |
| 7,180,510 B2 | * | 2/2007 | Inoue et al. | 345/180 |
| 7,524,066 B2 | * | 4/2009 | Sato | 353/30 |
| 7,683,881 B2 | * | 3/2010 | Sun et al. | 345/156 |
| 8,106,884 B2 | * | 1/2012 | Nam et al. | 345/158 |
| 8,311,366 B2 | * | 11/2012 | Schiewe et al. | 382/294 |

(Continued)

FOREIGN PATENT DOCUMENTS

| | | |
|---|---|---|
| CN | 1680867 A | 10/2005 |
| EP | 1 564 682 A2 | 8/2005 |

(Continued)

*Primary Examiner* — Jayesh A Patel
(74) *Attorney, Agent, or Firm* — Jefferson IP Law, LLP

(57) ABSTRACT

A method and system for generating data in a mobile device is provided. The method includes, outputting an image, stored in the mobile device, to an external screen, capturing the external screen on which the image is being displayed and creating a captured image, comparing the output image with the captured image and extracting an added image from the captured image, and creating data from the extracted image. When the mobile device user writes or draws on an external screen on which the mobile device outputs an image, the mobile device can capture the external screen, create data from the user's input content and store them in the storage unit.

10 Claims, 18 Drawing Sheets

(56) References Cited

U.S. PATENT DOCUMENTS

| | | | |
|---|---|---|---|
| 8,408,710 B2 * | 4/2013 | Jang et al. ............... 353/30 |
| 2001/0045940 A1 * | 11/2001 | Hansen ............... 345/158 |
| 2002/0001029 A1 | 1/2002 | Abe |
| 2004/0027328 A1 * | 2/2004 | Yang ............... 345/156 |
| 2004/0075820 A1 | 4/2004 | Chu et al. |
| 2005/0078092 A1 * | 4/2005 | Clapper ............... 345/173 |
| 2005/0180631 A1 | 8/2005 | Zhang et al. |
| 2006/0013508 A1 * | 1/2006 | Morichika ............... 382/312 |
| 2006/0077188 A1 * | 4/2006 | Byun ............... 345/179 |
| 2006/0158452 A1 * | 7/2006 | Borger et al. ............... 345/582 |
| 2006/0244278 A1 * | 11/2006 | Navarro Quesada ......... 294/146 |
| 2007/0222747 A1 * | 9/2007 | Kritt et al. ............... 345/156 |
| 2008/0010317 A1 * | 1/2008 | Tokai ............... 707/104.1 |
| 2008/0018591 A1 * | 1/2008 | Pittel et al. ............... 345/156 |
| 2008/0018745 A1 * | 1/2008 | Iyoda ............... 348/207.99 |
| 2008/0025605 A1 * | 1/2008 | Suino ............... 382/173 |
| 2008/0068562 A1 * | 3/2008 | Hirata ............... 353/25 |
| 2008/0095468 A1 * | 4/2008 | Klemmer et al. ............... 382/285 |
| 2009/0021480 A1 * | 1/2009 | Tagawa ............... 345/158 |
| 2009/0190046 A1 * | 7/2009 | Kreiner et al. ............... 348/789 |
| 2009/0244278 A1 * | 10/2009 | Taneja et al. ............... 348/143 |
| 2010/0110264 A1 * | 5/2010 | Carroll ............... 348/333.01 |

FOREIGN PATENT DOCUMENTS

| | | | |
|---|---|---|---|
| EP | 1564682 A2 * | 8/2005 | ............... G06T 5/00 |
| JP | 09175084 A | 7/1997 | |
| JP | 2007-256781 A | 10/2007 | |
| JP | 2009-083277 A | 4/2009 | |
| KR | 10-0580108 B1 | 5/2006 | |
| KR | 10-2007-0071712 A | 7/2007 | |
| KR | 10-0798991 B1 | 1/2008 | |
| WO | 2007/040322 A1 | 4/2007 | |

* cited by examiner

| | SUN | MON | TUE | WED | THU | FRI | SAT |
|---|---|---|---|---|---|---|---|
| DECEMBER | | | | | | | 2009 |
| AM | | | 1 | 2 | 3 | 4 | 5 |
| PM | | | | | | | |
| AM | 6 | 7 | 8 | 9 | 10 | 11 | 12 |
| PM | | | | | | | |
| AM | 13 | 14 | 15 | 16 | 17 | 18 | 19 |
| PM | | | | | | | |
| AM | 20 | 21 | 22 | 23 | 24 | 25 | 26 |
| PM | | | | | | | |
| AM | 27 | 28 | 29 | 30 | 31 | | |
| PM | | | | | | | |

200

100

METHOD AND SYSTEM FOR GENERATING DATA USING A MOBILE DEVICE WITH A PROJECTION FUNCTION

PRIORITY

This application claims the benefit under 35 U.S.C. §119(a) of a Korean patent application filed on Dec. 18, 2009 in the Korean Intellectual Property Office and assigned Serial No. 10-2009-0126564, the entire disclosure of which is hereby incorporated by reference.

BACKGROUND OF THE INVENTION

1. Field of the Invention

The present invention relates to electronic systems. More particularly, the present invention relates to a method and system for generating data from drawings and/or text that a user directly inputs on an external screen, using a mobile device.

2. Description of the Related Art

Mobile devices are widely used because they can be easily carried and provide a variety of functions as well as a voice call function. Mobile devices are now serving as multimedia communication devices since they can provide a service for transmitting a variety of data and other various additional services. In recent years, mobile devices have been developed to equip a projector module through which they can output their stored images to an external screen, wall, whiteboard, etc., so that many people can view the images.

When a mobile device with a projector module outputs an image on an external whiteboard via the projector module, the user may happen to directly draw or write on the whiteboard using a writing tool. In that case, the user may want to store the drawings or text on the whiteboard, as data, in the mobile device.

SUMMARY OF THE INVENTION

An aspect of the present invention is to address at least the above-mentioned problems and/or disadvantages and to provide at least the advantages described below. Accordingly, an aspect of the present invention is to provide a method and system for creating data from drawings and/or text that a user directly inputs on an external screen showing an image.

In accordance with an aspect of the invention, a method for generating data in a mobile device is provided. The method includes, outputting an image, stored in the mobile device, to an external screen, capturing the external screen on which the image is being displayed and creating a captured image, comparing the output image with the captured image and extracting an added image from the captured image, and creating data from the extracted image.

In accordance with another aspect of the invention, a mobile device is provided. The device includes a projector module for outputting an image to an external screen, a camera module for capturing the external screen on which the image is being displayed and creating a captured image, and a controller. The controller compares the output image with the captured image and extracts an added image from the captured image. The controller creates data from the extracted image.

In accordance with another aspect of the present invention, a method of generating data in a mobile device is provided. The method includes projecting a preset image from the mobile device onto an external screen, detecting an image added to the preset image by a user, and extracting the added image.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms or words in the following description and the claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, although exemplary embodiments of the present invention are explained based on a mobile device with a projector module and a camera module, it should be understood that the present invention is not limited to these exemplary embodiments. It should be understood that the present invention can also be applied to all types of mobile devices with a projector module and a camera module. It will also be appreciated that the present invention can be applied to all information communication devices, multimedia devices, and their applications, for example, a mobile communication system, a Portable Multimedia Player (PMP), a Personal Digital Assistant (PDA), a smart phone, an audio player (e.g., MP3 player), an International Mobile Telecommunication 2000 (IMT-2000) terminal, a Wideband Code Division Multiple Access (WCDMA) terminal, a Global System for Mobile communication/General Packet Radio Service (GSM/GPRS) terminal, a Universal Mobile Telecommunication Service (UMTS) terminal, etc.

Figure 1:
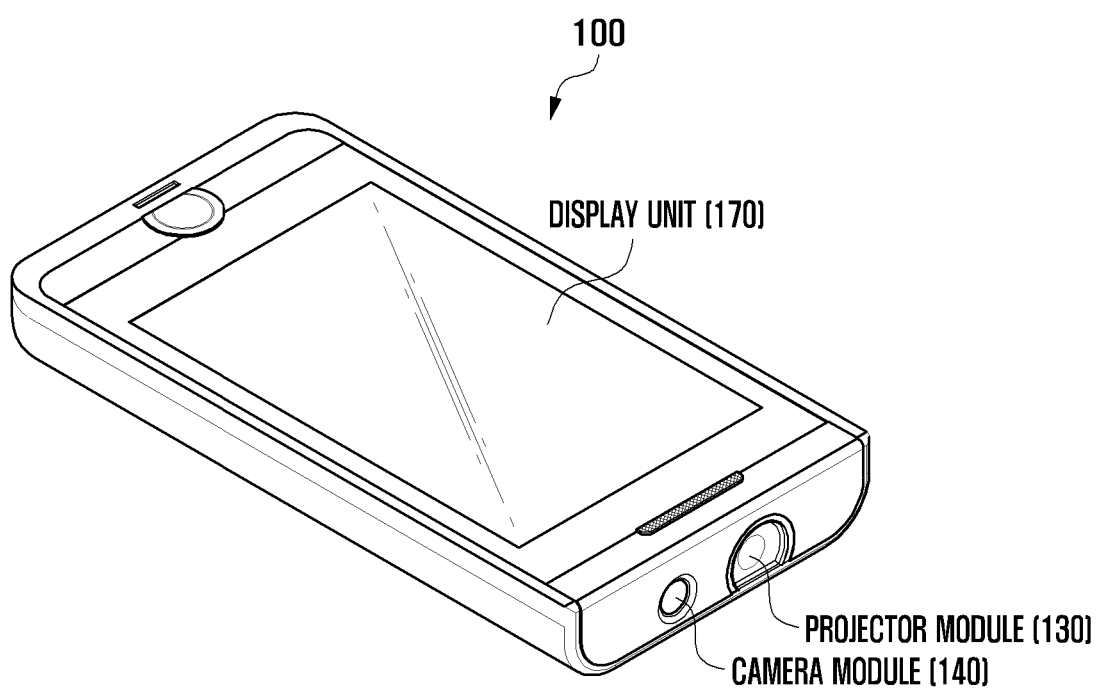
FIG. 1 illustrates a mobile device with a projector module and a camera module according to an exemplary embodiment of the present invention.

FIG. 1 illustrates a mobile device with a projector module and a camera module according to an exemplary embodiment of the present invention.

Referring to FIG. 1, the mobile device 100 includes a projector module 130, a camera module 140, and a display unit 170. The projector module 130 may be installed in the upper end portion of the mobile device 100 as shown in FIG. 1 so that the mobile device 100 may output a content frame from the mobile device 100 to an external screen, for example, while the user is viewing the content image displayed on the display unit 170. The camera module 140 may also be installed in the upper end portion of the mobile device 100 as shown in FIG. 1 so that the camera module 140 can capture the content image output to an external screen, for example, via the projector module 130.

The installation positions of the projector module 130 and the camera module 140 may be set in the mobile device 100 so that the frame of the image, captured and created by the camera module 140, is consistent with the frame of the content image, externally output by the projector module 130. It should be understood that the installation positions of the projector module 130 and the camera module 140 may be variously set in the mobile device 100. In that case, the user may vary the position of the camera module 140, so that the camera module 140 may capture part of the content image output via the projector module 130 or another back ground of a subject other than the content image. The following description explains the components of the mobile device 100 with reference to FIG. 2.

Figure 2:
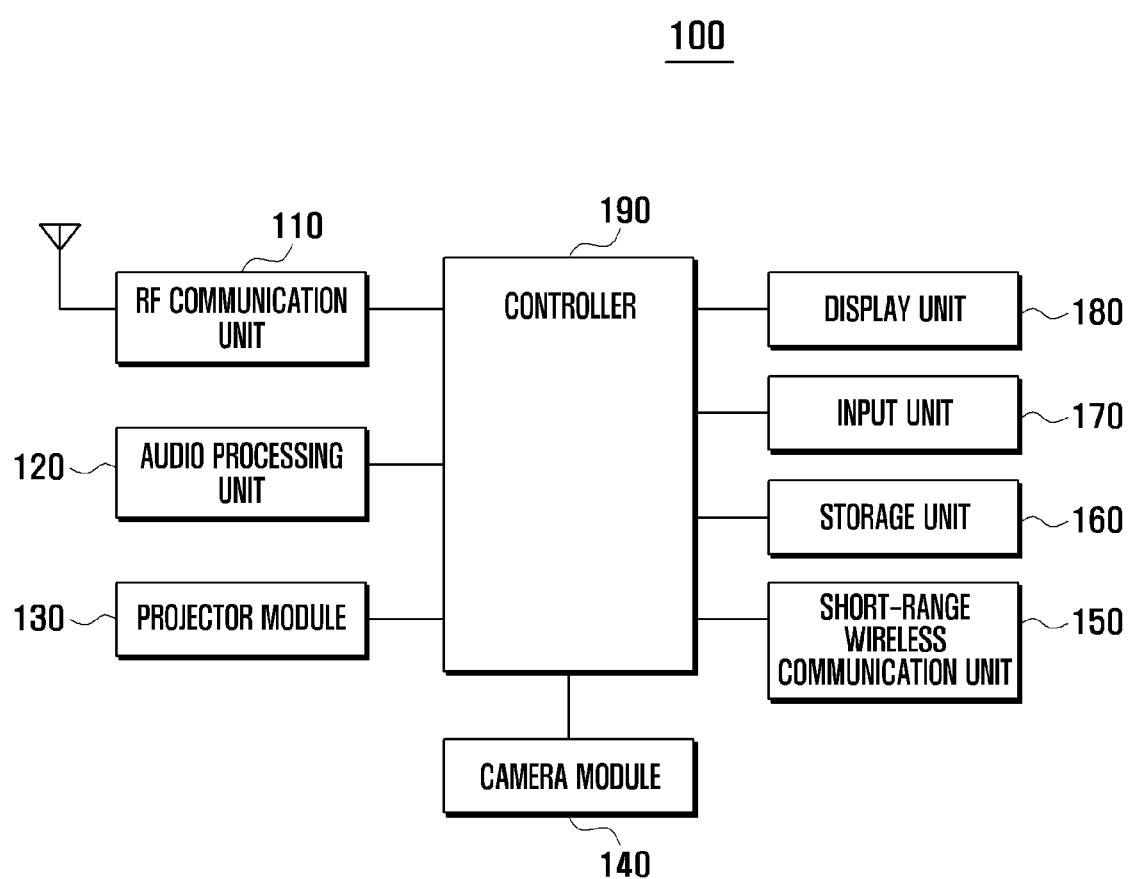
FIG. 2 illustrates a schematic block diagram of a mobile device with a projector module and a camera module according to an exemplary embodiment of the present invention.

FIG. 2 illustrates a schematic block diagram of a mobile device with a projector module and a camera module according to an exemplary embodiment of the present invention.

Referring to FIG. 2, the mobile device 100 includes an RF communication unit 110, an audio processing unit 120, the projector module 130, the camera module 140, a short-range wireless communication unit 150, a storage unit 160, an input unit 170, the display unit 180, and a controller 190. According to an exemplary embodiment of the present invention, the mobile device 100 may include additional and/or different units. Similarly, the functionality of two or more of the above units may be integrated into a single component.

The RF communication unit 110 wirelessly transmits and receives data to and from other communication systems. The RF communication unit 110 includes an RF transmitter for up-converting the frequency of signals to be transmitted and amplifying the signals and an RF receiver for low-noise amplifying received RF signals and down-converting the frequency of the received RF signals. The RF communication unit 110 receives data via an RF channel and outputs it to the controller 190. The RF communication unit 110 also transmits data, output from the controller 190, via the RF channel. According to an exemplary embodiment of the present invention, the RF communication unit 110 may transmit data, generated by the controller 190, to an external system or other mobile devices.

The audio processing unit 120 includes COder-DECoders (CODECs). The CODECs comprise a data CODEC for processing packet data, etc. and an audio CODEC for processing audio signals, such as voice signals, etc. The audio CODEC converts digital audio signals into analog audio signals and outputs them via a speaker. The audio CODEC also converts analog audio signals received by a microphone into digital audio signals.

The projector module 130 performs a scan function and outputs text, a picture, a photograph, a moving image, etc. onto an external screen. The projector module 130 includes a scan lamp (not shown) and a focus adjustment unit (not shown). The scan lamp emits light from the projector module 130. The focus adjustment unit adjusts the focus of the content image output to the external screen. The focus adjustment unit may adjust the focus of the content image output to the external screen, under the control of the controller 190. Alternatively, an additional adjustment mechanism (e.g., a wheel key), installed in the mobile device 100, may adjust the focus of the content image output to the external screen, according to a user's operation.

The camera module 140 includes a camera sensor (not shown) for sensing an optical signal corresponding to an image of a subject and transforming the optical signal to an electrical signal and a signal processing unit (not shown) for converting an analog video signal to digital data. The camera sensor may be implemented with a Charge-Coupled Device (CCD) sensor or Complementary Metal-Oxide Semiconductor (CMOS) sensor. The signal processing unit may be implemented with a Digital Signal Processor (DSP). The camera sensor and the signal processing unit may be formed integrally or separately. The camera module 140 may capture a content image that the projector module 130 outputs on an external screen.

The short-range wireless communication unit 150 allows the mobile device 100 to perform data communication with external communication systems or other mobile devices. The short-range wireless communication unit 150 may be implemented with a Bluetooth communication module, an Infrared communication module, a Zigbee communication module, an Ultra-Wide Band (UWB) communication module, a Wi-Fi communication module, etc. The short-range wireless communication unit 150 may transmit data from the mobile device 100 to external communication systems or other mobile devices.

The storage unit 160 stores programs required to operate the mobile device 100 and data generated when the mobile device 100 is operated. The storage unit 160 includes a program storage area and a data storage area. The storage unit 160 may be implemented with volatile storage media or non-volatile storage media or a combination thereof. The volatile storage media includes semiconductor memory, such as Random Access Memory (RAM), Dynamic RAM (DRAM), Static RAM (SRAM), etc. The non-volatile storage media includes a hard disk. The storage unit 160 may store image or text data. The storage unit 160 also stores images captured by the camera module 140. In addition, the storage unit 160 may store only part of the images extracted, by the controller, from among the images captured by the camera module 140. The storage unit 160 may store the part of the extracted images, or may convert the extracted images to text and then store the extracted images. The storage unit 160 may store format images designed to have certain forms, such as an idle screen, menu screens, application executing screens, etc. The storage unit 160 may also combine and store the part of the images extracted by the controller with the stored format images.

The input unit 170 receives a user's key operation signals for controlling the mobile device 100 and outputs the key operation signals to the controller 190. The input unit 170 may be implemented with various types of keypads, including numerical keys, alphabetical keys, and directional keys, for example a 3×4 keypad, a QWERTY keypad, a touch panel, etc. The input unit 170 may create input signals for executing applications of the mobile device 100, according to a user's input, and output them to the controller 190. Examples of the applications include a voice call, moving image playback, audio playback, image displaying, broadcast viewing, camera capture, audio recording, calculator, scheduler, etc.

The mobile device 100 may further include a jog key, a wheel key, etc. These additional keys may serve to adjust the focus of the content image, output from the mobile device 100, on an external screen. The input unit 170 may be separately configured from the mobile device 100. For example, when the short-range wireless communication unit 150 is implemented with a Bluetooth communication module and the mobile device 100 establishes a channel with an external Bluetooth communication system via the short-range wireless communication unit 150, input keys of the external Bluetooth communication system can serve as the input unit 170 of the mobile device 100. In addition, when the mobile device 100 includes a number of projector modules and at least one projector module outputs a virtual keyboard, the virtual keyboard can also serve as the input unit 170.

The display unit 180 may be implemented with a Liquid Crystal Display (LCD). The display unit 180 displays menus, input data, function-setting information, and additional information. For example, the display unit 180 displays a booting screen, an idle screen, a call screen, and application executing screens of the mobile device. The display unit 180 may display the same image as the image that appears on an external screen. The display unit 180 may also display a preview screen while the camera module 140 is capturing an image displayed on the external screen. The display unit 180 may display newly created data when the controller 190 stores the newly created data in the storage unit 160, so that the user may identify the newly created data.

The controller 190 controls the entire operation of the mobile device 100. The controller 190 controls the projector module 130 to output images stored in the storage unit 160 to an external screen. The controller 190 may output format images with a preset form or output images that don't have a certain form, via the projector module 130. The controller 190 may control the projector module 130 to output light without containing an image signal. The controller 190 controls the camera module 140 to capture a content image displayed on an external screen or to display the captured images to the display unit 180. When the user inputs a capture command to the input unit 170, the controller 190 controls the camera module 140 to capture a content image displayed on an external screen. The controller 190 may also control the camera module 140 to repeatedly and periodically capture content images displayed on an external screen.

The controller 190 compares a content image output via the projector module 130 with an image captured by the camera module 140, and determines whether a particular image is added to the captured image. The projector module 130 may output a content image on an external screen that may allow a user to write or draw using a writing tool, for example, a whiteboard. While the content image of the projector module 130 is being displayed on the whiteboard, the user may write or draw thereon. In that case, the camera module 140 may capture the content image with the user's written or drawn content that are appearing on the external whiteboard, and output the content image to the controller 190. The controller 190 compares the captured content image with the original content image. When the captured content image differs from the original content image, the controller 190 determines that the captured content image contains the user's input content. The controller 190 extracts the added image corresponding to the user's input content from the captured content image and creates data. The controller 190 may create image data directly from the extracted image. Alternatively, the controller 190 may create text data from the extracted image by performing a conversion (e.g., optical character recognition) with respect to the extracted image. In addition, the controller 190 may combine the extracted image with the content image output from the projector module 130 to create image data. The controller 190 stores the created data in the storage unit 160.

The controller 190 controls the projector module 130 to output a format image of a preset form on an external screen and also the camera module 140 to capture the external screen on which the format image is displayed. The controller 190 compares the format image output from the projector module 130 with an image captured by the camera module 140, and determines whether the captured image contains an added image. When the user writes or draws on the external screen on which the format image is being displayed, using a writing tool, the controller 190 compares the original format image with the captured image. When the original format image differs from the captured image, the controller 190 determines that the captured image contains an added image corresponding to the user's input content. The controller 190 may detect where the added image is located in the format image. The controller 190 may combine the extracted image with the format image, based on the detected location, and create corresponding data. The controller 190 stores the created data in the storage unit 160. In addition, the controller 190 may also convert the added image corresponding to the user's input content into text data.

The controller 190 may store the extracted image in the storage unit 160, together with information about a location where the extracted image is located in the format image. The location information to be stored may vary according to the format images. For example, when a user writes content in a region of a particular date in a calendar image on the external screen, the controller 190 matches the user's input content with date information and stores it in the storage unit 160.

The foregoing description explained the configuration of the mobile device 100 including the projector module 130 and the camera module 140. The following description explains a method for generating data in the mobile device 100 with reference to FIG. 3.

Figure 3:
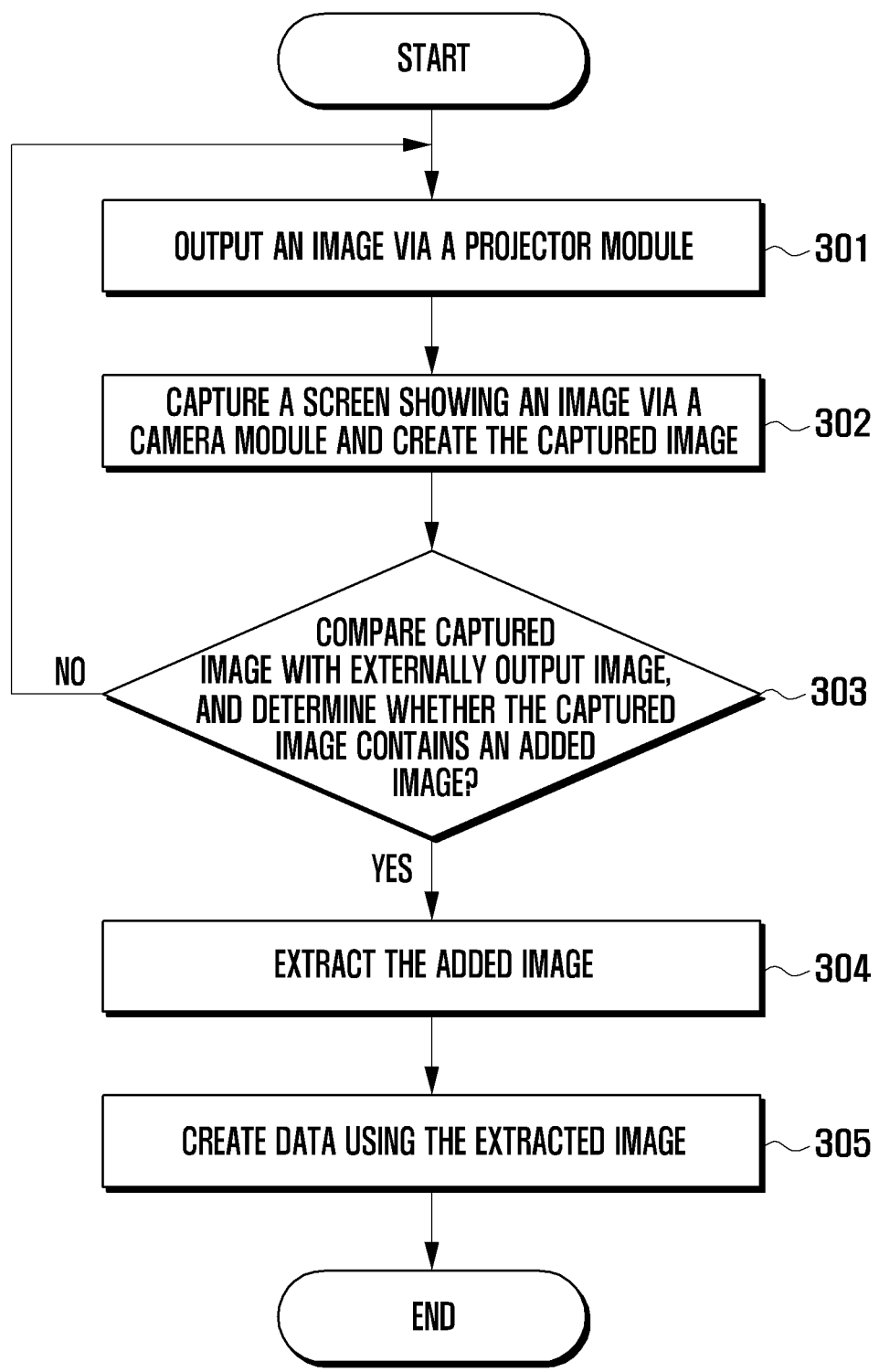
FIG. 3 illustrates a flowchart that describes a method for generating data in a mobile device according to an exemplary embodiment of the present invention.

FIG. 3 illustrates a flowchart that describes a method for generating data in a mobile device according to an exemplary embodiment of the present invention.

Referring to FIG. 3, the controller 190 controls the projector module 130 to output at least one of the images stored in the storage unit 160 to an external screen in step 301. The external screen may be a screen (e.g., a whiteboard) or any surface on which a user may write or draw using a writing tool. The controller 190 controls the projector module 130 to output an idle screen, a menu screen, an application executing screen, etc., on an external screen 200, where all of the content images from the projector module 130 are the same as the display unit 180. The controller 190 may also control the projector module 130 to output a photograph image on the external screen. The controller 190 may control the projector module 130 to output an image without containing any pattern. The controller 190 may also control the projector module 130 to only output light without containing any image. The controller 190 may also display images that are identical to the images that the projector module 130 outputs on an external screen.

The controller 190 controls the camera module 140 to capture the external screen on which an image is being displayed and creates a captured image in step 302. The camera module 140 may capture the external screen so that the frame of the image, output from the projector module 130, is consistent with that of the preview screen displayed on the display unit 180. When the user inputs a capture command to the input unit 170, the controller 190 controls the camera module 140 to capture the external screen on which the image is being displayed. The controller 190 may also control the camera module 140 to repeatedly and periodically capture the external screen on which the image is being displayed.

The controller 190 compares the image output from the projector module 130 with the captured image and determines whether the captured image contains an added image in step 303. When the user writes or draws on the external screen, on which a content image output from the projector module 130 is being displayed, and the camera module 140 captures the content image together with the user's input content, the controller 190 compares the original content image with the captured image. When the captured image differs from the original content image, the controller 190 detects the user's input content as an added image.

The controller 190 extracts the added image from the captured image in step 304 and creates data based on the extracted image in step 305. The controller 190 may create image data directly from the extracted image. The controller 190 may also create text data from the extracted image by performing the conversion with respect to the extracted image. To this end, the storage unit 160 stores a text-recognition application program. The controller 190 executes the text-recognition application program to convert part of the user's input content into text data. In addition, the controller 190 combines the extracted image with an image, output from the projector module 130, and creates image data. The controller 190 stores the created data in the storage unit 160.

The following description explains the operation modes when the first embodiment of a method crates data in a mobile device 100, with reference to FIGS. 4A to 4C, FIGS. 5A and 5B, and FIGS. 6A to 6C.

Figure 4A:
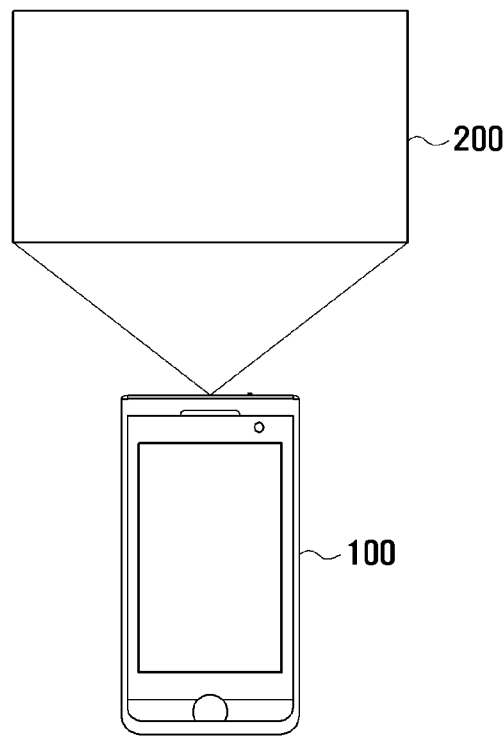
FIGS. 4A to 4C illustrate a screen and a mobile device that describes a first operation mode when a method creates data in a mobile device according to an exemplary embodiment of the present invention.
Figure 4B:
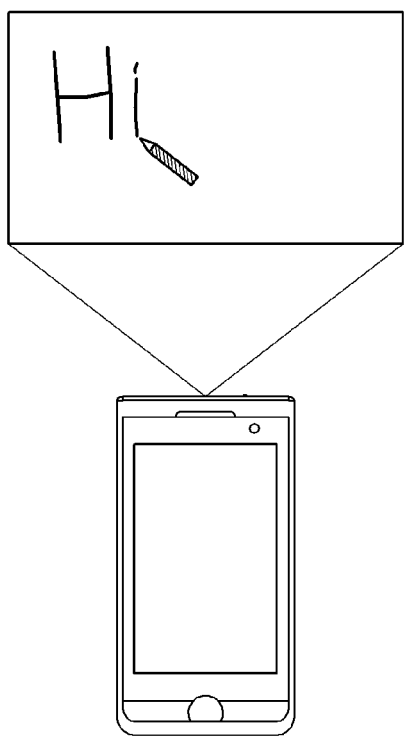
Figure 4C:
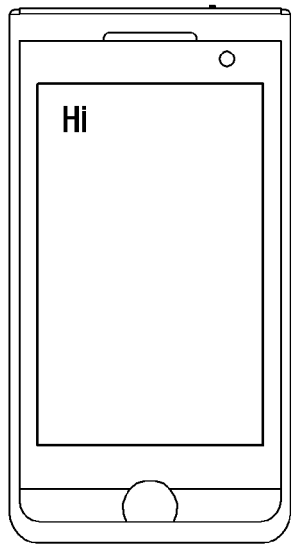

FIGS. 4A to 4C illustrate a screen and a mobile device that describes a first operation mode when a method creates data in a mobile device according to an exemplary embodiment of the present invention.

Referring to FIG. 4A, the mobile device 100 outputs an image without containing content, i.e., light, to an external screen 200 via the projector module 130. The mobile device 100 may also display the same image as the projector module 130 on the display unit 180.

Referring to FIG. 4B, the mobile device 100 outputs an image without containing content to an external screen 200, for example, a whiteboard, via the projector module 130, and the user writes 'Hi' on the whiteboard using a writing tool. In that case, the mobile device 100 may control the camera module 140 to capture the external screen 200 on which the image and the text 'Hi' are being displayed and may create a captured image. The mobile device 100 compares the original image, output from the projector module 130 as shown in FIG. 4A, with the captured image containing the text 'Hi' and detects the text image 'Hi' as an added image. The mobile device 100 extracts the text 'Hi' from the captured image and creates text data. The mobile device 100 may convert the text image 'Hi' into text data. To this end, the mobile device 100 may previously install a text recognition application program. The text recognition application program converts the text image 'Hi' in the captured image into text data 'Hi'.

Referring to FIG. 4C, the mobile device 100 also displays the created text data 'Hello' on the display unit 180. As described above, FIGS. 4A to 4C show an operation mode of the mobile device 100. When the user writes on the external screen 200, the mobile device 100 captures the external screen 200 via the camera module 140, extracts the user's written text from the captured image, and converts it into text data.

Figure 5A:
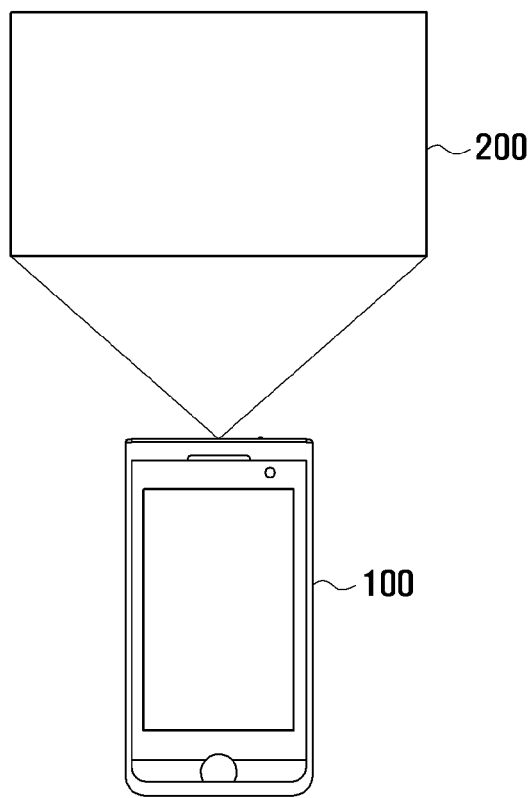
FIGS. 5A to 5C illustrate a screen and a mobile device that describes a second operation mode when a method creates data in a mobile device according to an exemplary embodiment of the present invention.
Figure 5B:
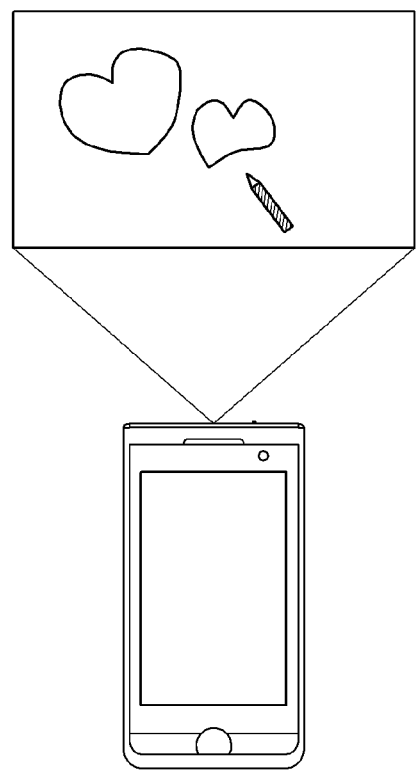
Figure 5C:
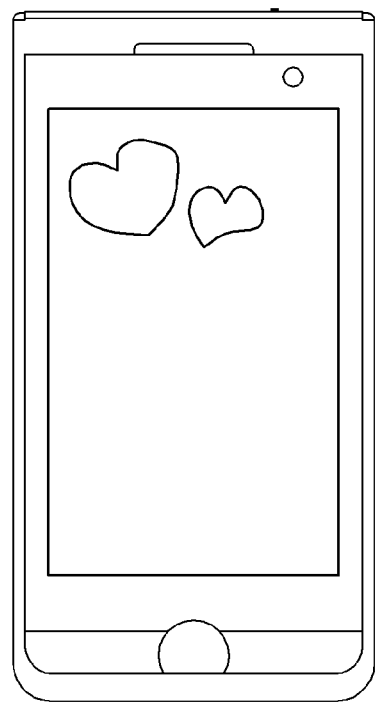

FIGS. 5A to 5C illustrate a screen and a mobile device that describes a second operation mode when a method creates data in a mobile device according to an exemplary embodiment of the present invention.

Referring to FIG. 5A, the mobile device 100 outputs an image without containing content, i.e., light, to an external screen 200 via the projector module 130. The mobile device 100 may also display the same image as the projector module 130 on the display unit 180.

Referring to FIG. 5B, the mobile device 100 outputs an image without containing content to an external screen 200, for example, a whiteboard, via the projector module 130, and the user draws two heart shapes on the whiteboard using a writing tool. The mobile device 100 controls the camera module 140 to capture the external screen 200 on which the image and the drawing 'two heart shapes' are being displayed and creates a captured image. The mobile device 100 compares the original image, output from the projector module 130 as shown in FIG. 5A, with the captured image containing the drawing 'two heart shapes' and detects the drawing 'two heart shapes' image as an added image. The mobile device 100 extracts the drawing 'two heart shapes' from the captured image and creates image data. The mobile device 100 may directly create image data from the drawing 'two heart shapes' image.

Referring to FIG. 5C, the mobile device 100 also displays the created image data corresponding to the 'two heart shapes' image on the display unit 180. As described above, FIGS. 5A to 5C show an operation mode of the mobile device 100. When the user draws a drawing on the external screen 200, the mobile device 100 captures the external screen 200 via the camera module 140, extracts the user's drawn drawing from the captured image, and converts it into image data.

Figure 6A:
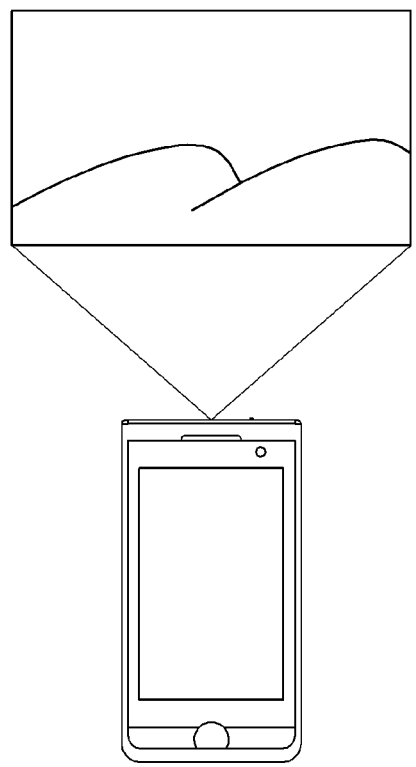
FIGS. 6A to 6C illustrate a screen and a mobile device that describes a third operation mode when a method creates data in a mobile device according to an exemplary embodiment of the present invention.
Figure 6B:
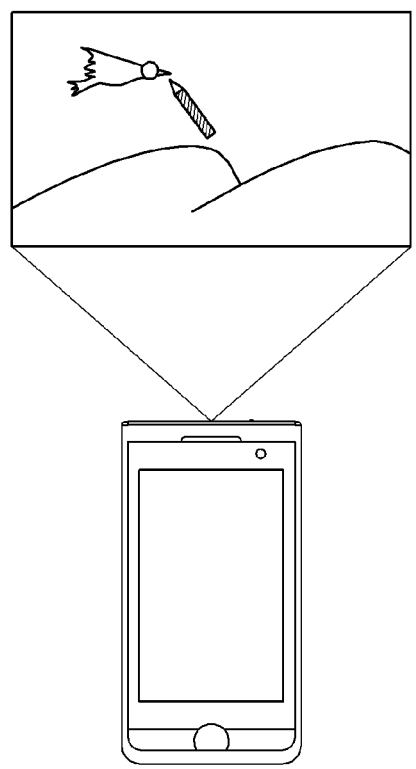
Figure 6C:
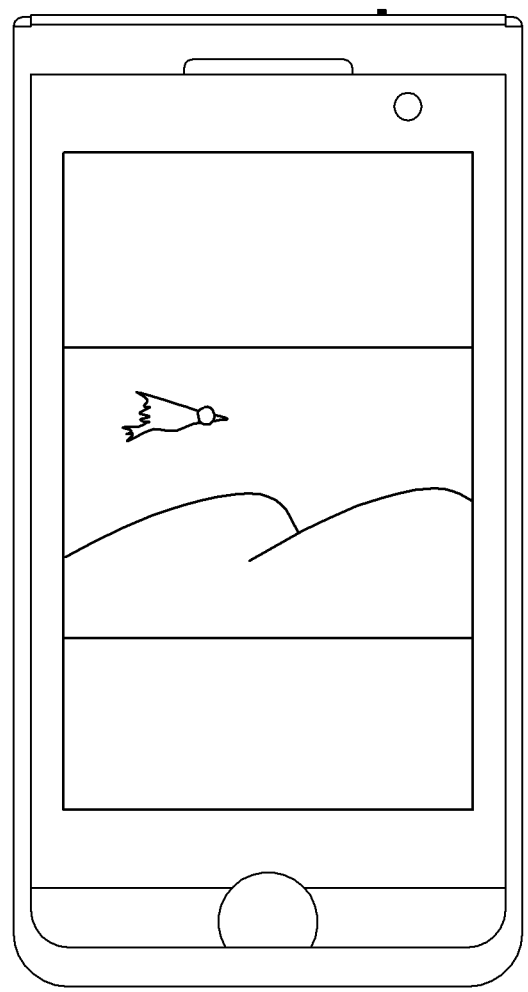

FIGS. 6A to 6C illustrate a screen and a mobile device that describes a third operation mode when a method creates data in a mobile device according to an exemplary embodiment of the present invention.

Referring to FIG. 6A, the mobile device 100 outputs an image with content, for example, mountains, to an external screen 200 via the projector module 130. The mobile device 100 may also display the same image as the projector module 130 on the display unit 180.

Referring to FIG. 6B, the mobile device 100 outputs the mountain image to an external screen 200, for example, a whiteboard, via the projector module 130, and the user draws a 'bird' on the external screen 200 using a writing tool. The mobile device 100 may control the camera module 140 to capture the external screen 200 on which the bird image is drawn and may create a captured image. The mobile device 100 compares the original mountain image, output from the projector module 130 as shown in FIG. 6A, with the captured image containing the mountains and bird images and detects the bird image as an added image. The mobile device 100 extracts the bird image from the captured image. The mobile device 100 combines the extracted bird image with the original mountain image and creates image data.

Referring to FIG. 6C, the mobile device 100 also displays the created image data, synthesizing the bird and mountain images, on the display unit 180. As described above, FIGS. 6A to 6C show an operation mode of the mobile device 100. When the user draws a drawing on the external screen 200 on which a content image output from the projector module 130 is being displayed, the mobile device 100 captures the external screen 200 via the camera module 140, extracts the user's drawing from the captured image, and creates image data by combining the extracted image with the original content image.

The mode described above with respect to FIGS. 6A-6C may be used when the frame of the image captured by the camera module 140 differs from that of the content image output from the projector module 130. When the frame of the image captured by the camera module 140 differs from that of the content image output from the projector module 130, the captured image itself cannot be used to create a synthesized image. In that case, the mobile device 100 separately acquires an image corresponding to the user's content input to the external screen 200 and adjusts the frame size of the acquired image to that of the content image of the projector module 130, so that the image, corresponding to the user's content input to the external screen 200, may be combined with the content image output from the projector module 130.

The foregoing description explained an exemplary embodiment of a method for creating data in a mobile device 100. The following description explains a method for generating data in a mobile device 100 when the content image output from the projector module 130 is a format image of a preset form.

Figure 7:
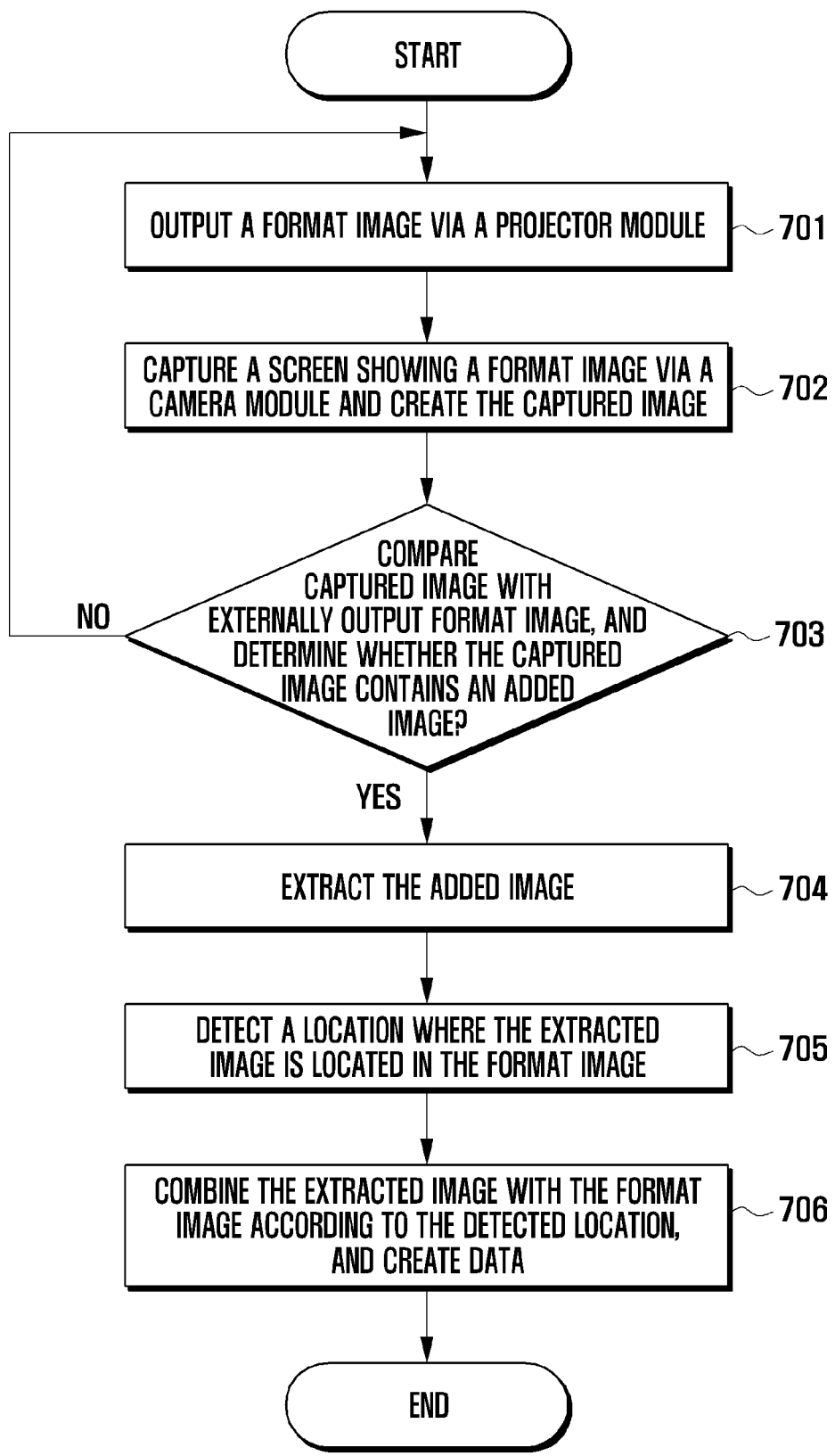
FIG. 7 illustrates a flowchart that describes a method for generating data in a mobile device according to an exemplary embodiment of the present invention.

FIG. 7 illustrates a flowchart that describes a method for generating data in a mobile device according to an exemplary embodiment of the present invention.

The controller 190 controls the projector module 130 to output a preset image, from among the images stored in the storage unit 160, to an external screen or other external surface in step 701. The format image may correspond to images forming a menu screen, a setting screen, an application executing screen, etc. The format image may include a number of areas to which coordinate values are assigned to, respectively. The coordinate values, assigned to the areas, may be used to detect the locations where the user inputs content on the external screen, when the mobile device 100 extracts images corresponding to the user's input content. The format image may include a number of areas, where at least one of the areas may be blank. For example, the format image may correspond to a calendar image for a scheduler function, a business card registering screen image for a business card function, a memo input screen image for a memo function, etc. The controller 190 may also display images that are identical to the images that the projector module 130 outputs on an external screen.

The controller 190 controls the camera module 140 to capture the external screen on which the format image is being displayed and creates a captured image in step 702. The camera module 140 may capture the external screen so that the frame of the format image, output from the projector module 130, is consistent with that of the preview screen displayed on the display unit 180. To do this, the positions in the mobile device 100 at which the projector module 130 and the camera module 140 are installed may be selected appropriately. The mobile device 100 may be designed in such a way that, when the user inputs a capture command to the input unit 170, the controller 190 controls the camera module 140 to capture the external screen on which the format image is being displayed. The controller 190 may also control the camera module 140 to repeatedly and periodically capture the external screen on which the format image is being displayed.

The controller 190 compares the format image output from the projector module 130 with the captured image and determines whether the captured image contains an added image in step 703. For example, when the projector module 130 outputs a format image containing a number of blank frames and the user writes or draws on the external screen on which the blank frames are being displayed, the controller 190 compares the original format image (i.e., an image of blank frames) with the captured image that is created as the camera module 140 captures the frame image together with the user's input content. When the captured image differs from the original format image, the controller 190 detects the user's input content as an added image.

The controller 190 extracts the added image from the captured image in step 704 and detects the location of the extracted image in the format image in step 705. When the format image includes a number of areas to which coordinate values are respectively assigned, the controller 190 detects the coordinate values for the added image while extracting the added image. The captured image may be represented by a number of pixels each of which has a coordinate value. The controller 190 detects the coordinate values corresponding to the pixels forming the extracted image and identifies the areas corresponding to the coordinate values, from among the number of areas forming the format image.

The controller 190 creates image data by combining the extracted image with the format image in step 706. The controller 190 identifies the areas corresponding to the extracted image and creates image data by inserting the extracted image into the identified areas. The controller 190 may also create image data directly from the extracted image. The controller 190 may create text data from the extracted image by performing the conversion with respect to the extracted image. The controller 190 stores the created data in the storage unit 160.

The following description explains the operation modes when the second embodiment of a method creates data in a mobile device 100, with reference to FIGS. 8A to 8C, FIGS. 8A and 8B, and FIGS. 10A to 10C.

Figure 8A:
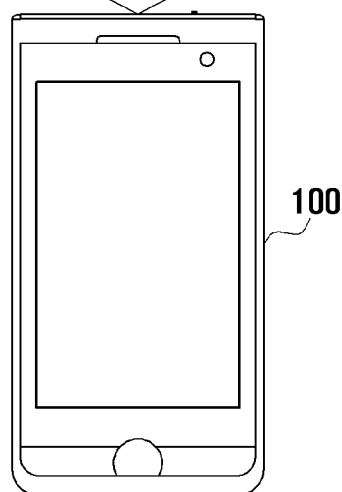
FIGS. 8A to 8C illustrate a screen and a mobile device that describes a first operation mode when a method creates data in a mobile device according to an exemplary embodiment of the present invention.
Figure 8B:
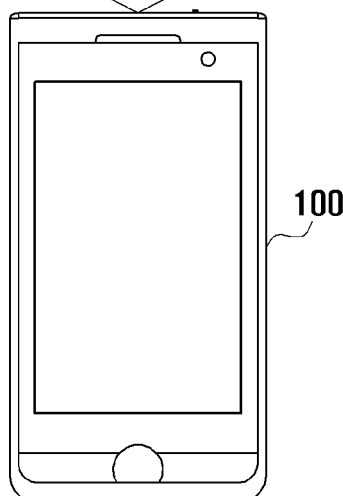
Figure 8C:
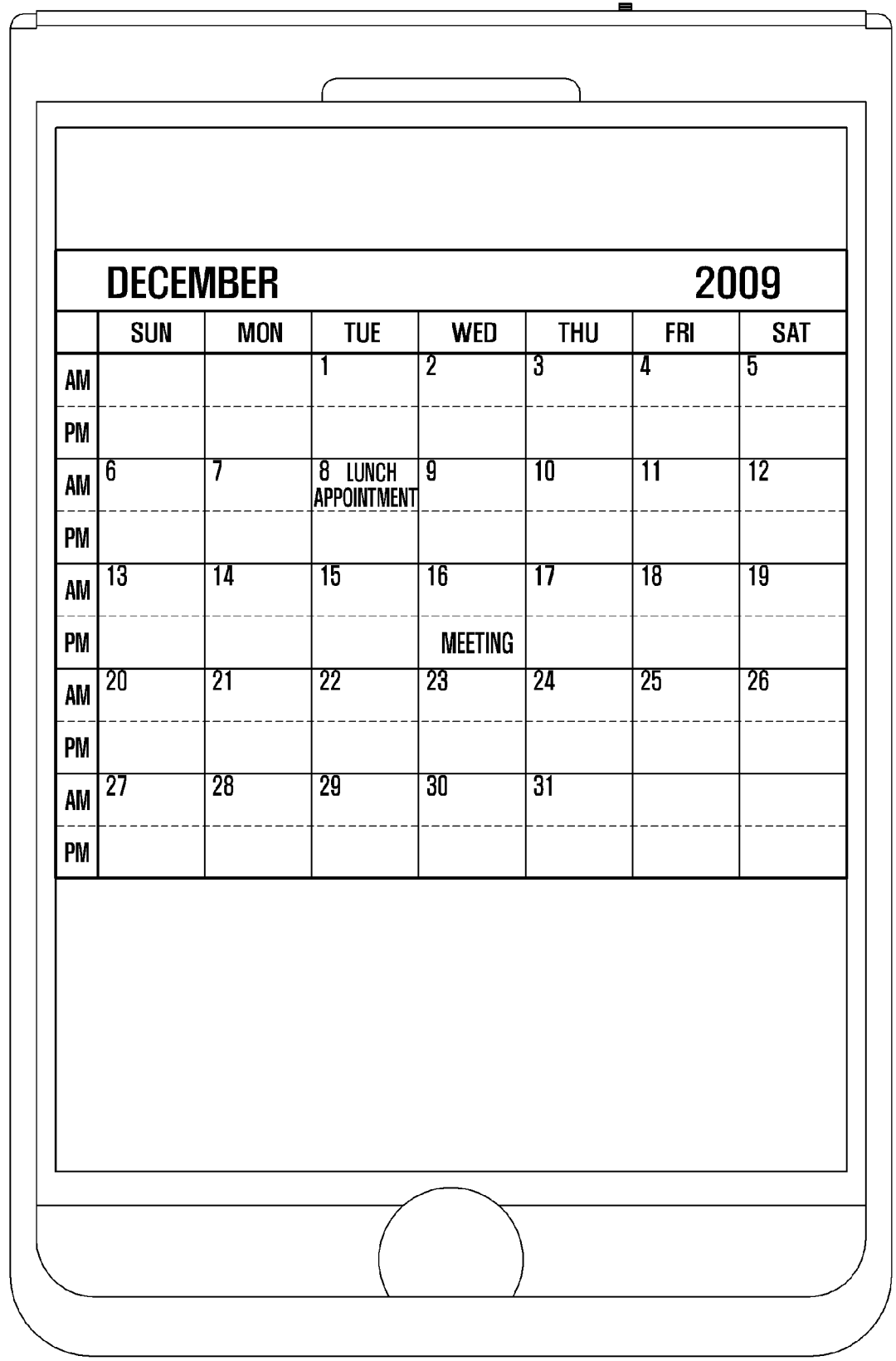

FIGS. 8A to 8C illustrate a screen and a mobile device that describes a first operation mode when a method creates data in a mobile device according to an exemplary embodiment of the present invention.

Referring to FIG. 8A, the mobile device 100 outputs a format image to an external screen 200 via the projector module 130 (not shown). For example, the format image may be a calendar image when the mobile device 100 executes a scheduler function. The calendar image contains regions by dates and each region has two sub-regions representing the morning and afternoon. Each date region may also be divided into sub-regions by times. The mobile device 100 may also display the same image as the projector module 130 on the display unit 180.

Referring to FIG. 8B, when the mobile device 100 outputs the calendar image to an external screen 200 via the projector module 130, the user writes 'Lunch appointment' in the foregoing sub-region of the date region, on the 8th of December, on the external screen 200, using a writing tool, and 'Meeting' in the afternoon sub-region of the date region, on the 16th. The mobile device 100 controls the camera module 140 to capture the external screen 200 on which the calendar image and the user's input content are being displayed, and creates a captured image. The mobile device 100 compares the original calendar image, output from the projector module 130 as shown in FIG. 8A, with the captured image containing the calendar image and the user's input content, and detects the text 'Lunch appointment' and 'Meeting' as an added image. The mobile device 100 extracts the added image from the captured image.

Simultaneously, the mobile device 100 also detects the locations where the text 'Lunch appointment' and 'Meeting' are located in the calendar image. The mobile device 100 detects the coordinate values corresponding to the pixels where the text 'Lunch appointment' and 'Meeting' are located, from the pixels forming the calendar image, and identifies regions corresponding to the detected coordinate values in the calendar image. The mobile device 100 detects that the text 'Lunch appointment' and 'Meeting' are located in the morning of the 8th of December and in the afternoon of the 16th, respectively. The mobile device 100 combines the extracted images, the text 'Lunch appointment' and 'Meeting', with the calendar image to create data of a single image. The mobile device 100 may also create data by inputting 'Lunch appointment' into the morning sub-region of the 8th and 'Meeting' into the afternoon of the 16th, respectively.

The mobile device 100 may also convert the extracted images, the 'Lunch appointment' and 'Meeting', into text data. To do this, the mobile device 100 may have a text-recognition application program installed so that the mobile device 100 may convert the extracted image into text.

Referring to FIG. 8C, the mobile device 100 also displays the created text data 'Lunch appointment' and 'Meeting' on the display unit 180, where the text data 'Lunch appointment' and 'Meeting' are converted from the user's input 'Lunch appointment' and 'Meeting' image via the text-recognition application program and combined with the calendar image. In the calendar image, 'Lunch appointment' is input into the morning sub-region of the 8th and 'Meeting' is input into the afternoon of the 16th.

Figure 9A:
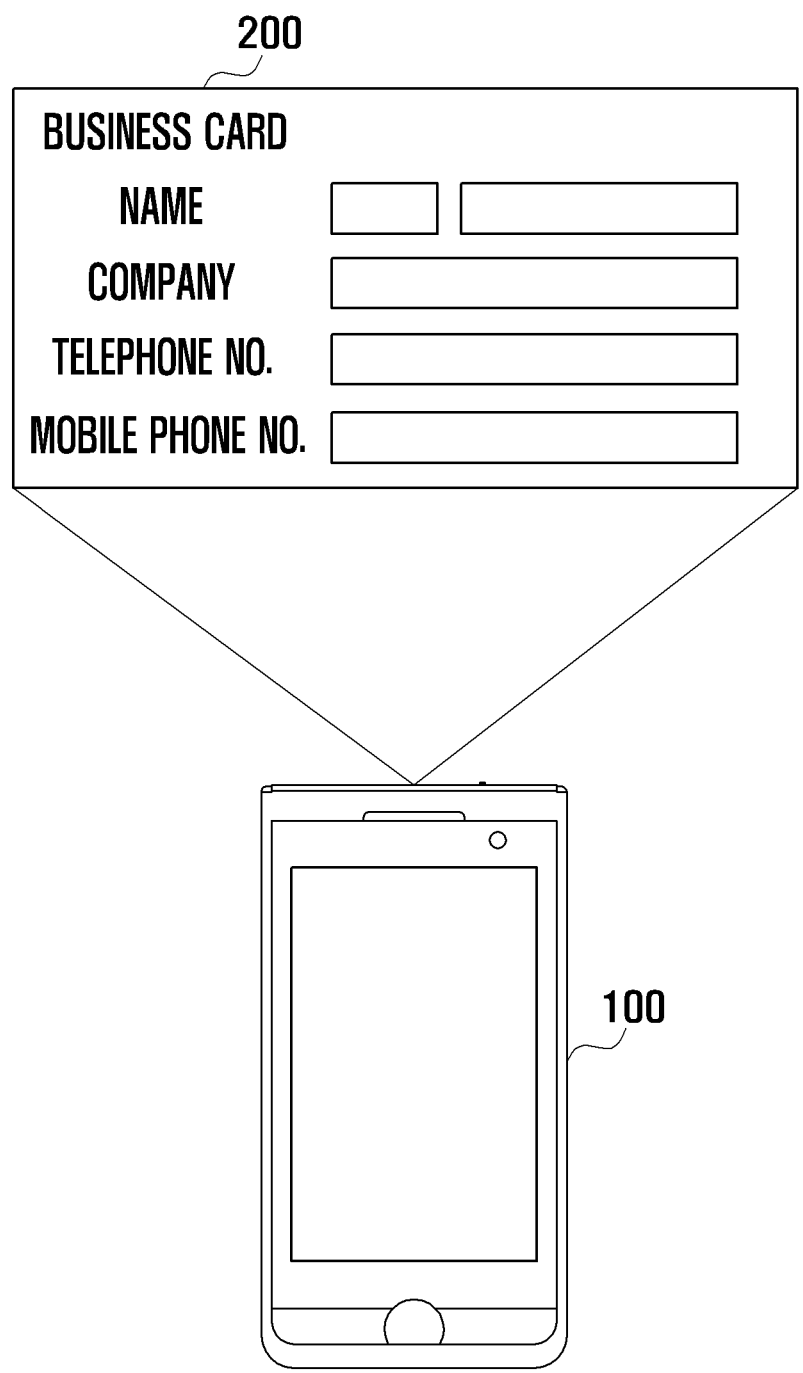
FIGS. 9A to 9C illustrate a screen and a mobile device that describes a second operation mode when a method creates data in a mobile device according to an exemplary embodiment of the present invention.
Figure 9B:
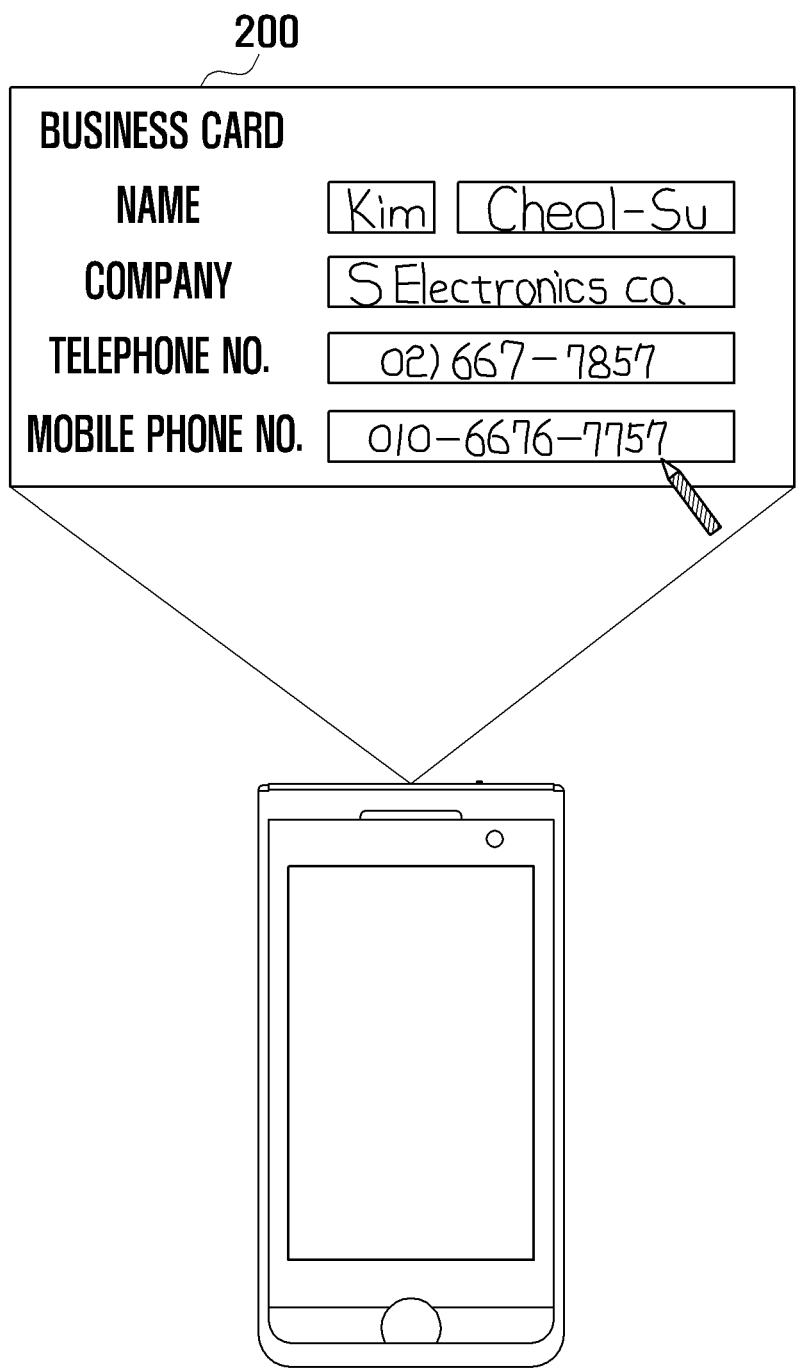
Figure 9C:
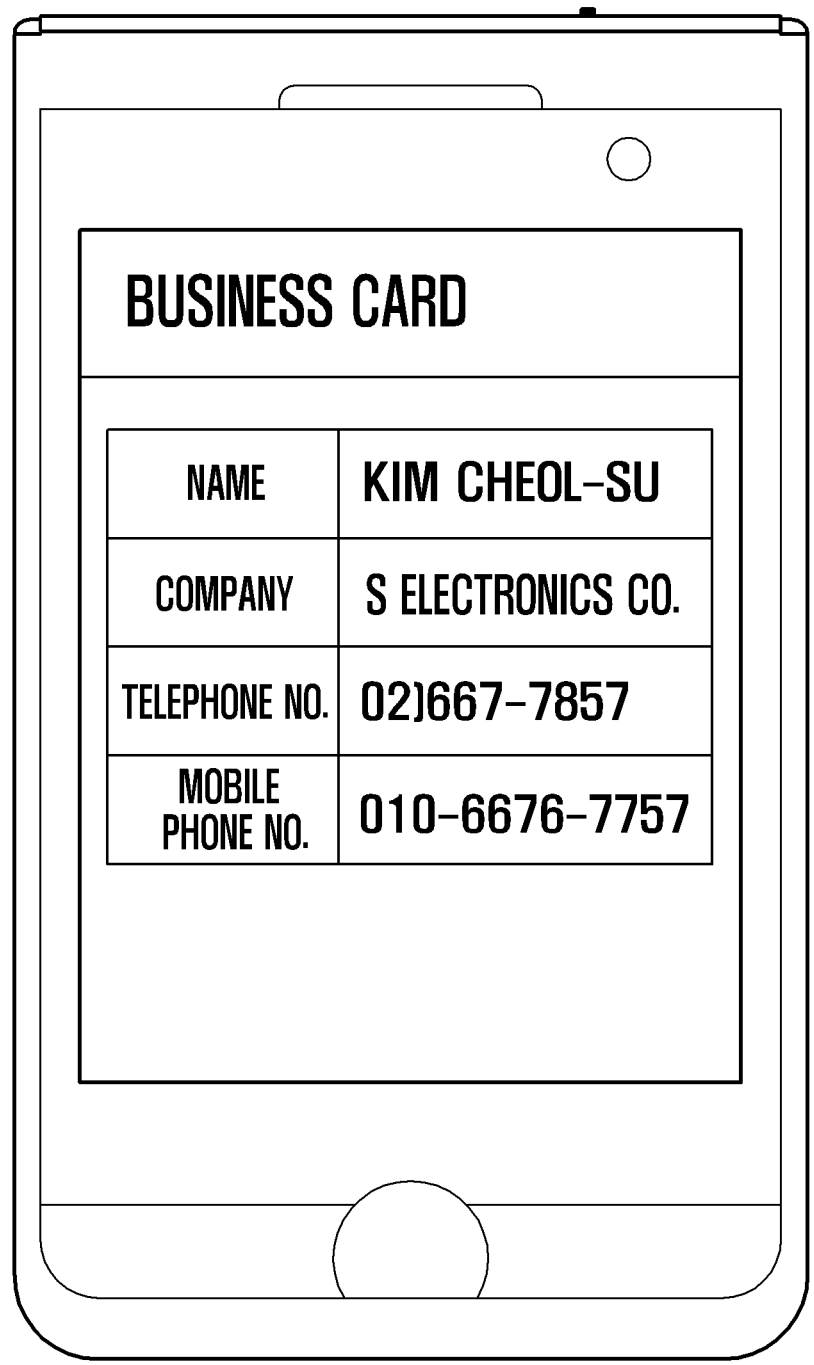

FIGS. 9A to 9C illustrate a screen and a mobile device that describes a second operation mode when a method creates data in a mobile device according to an exemplary embodiment of the present invention.

Referring to FIG. 9A, the mobile device 100 outputs a format image, for example, a business card registration screen image, to an external screen 200 via the projector module 130. The business card registration screen image may be output when the mobile device 100 executes a business card function. The business card registration screen image includes items with input fields. The mobile device 100 may also display the same image as the projector module 130 on the display unit 180.

Referring to FIG. 9B, when the mobile device 100 outputs a business card registration screen image to the external screen 200, for example, a whiteboard, via the projector module 130, the user writes 'Kim' and 'Cheol-Su' in the field 'Name', 'S Electronics Co.' in 'Company,' '02)667-7857' in 'Telephone No.' and '010-6676-7757' in 'Mobile Phone No.,' using a writing tool. The mobile device 100 controls the camera module 140 to capture the external screen 200, on which the business card registration screen image and the 'Kim' and 'Cheol-Su,'S Electronics Co.,'02)667-7857', and '010-6676-7757' images are being displayed, and creates a captured image.

The mobile device 100 compares the original business card registration screen image, output from the projector module 130 as shown in FIG. 9A, with the captured image, and detects the 'Kim' and 'Cheol-Su', 'S Electronics Co.', '02) 667-7857', and '010-6676-7757' images as added images. The mobile device 100 extracts the added images from the captured image. The mobile device 100 detects the locations where the 'Kim' and 'Cheol-Su', 'S Electronics Co.', '02) 667-7857', and '010-6676-7757' images are input. The mobile device 100 detects the coordinate values corresponding to the pixels that the 'Kim' and 'Cheol-Su', 'S Electronics Co.', '02)667-7857', and '010-6676-7757' images occupy, from the pixels forming the business card registration screen image, and then identifies the area corresponding to the coordinate values, from the areas forming the business card registration screen image. The mobile device 100 determines that Kim' and 'Cheol-Su' are located in the field of 'Name', 'S Electronics Co.' in 'Company', '02)667-7857' in 'Telephone No', and '010-6676-7757' in 'Mobile Phone No.' The mobile device 100 combines the extracted images, 'Kim' and 'Cheol-Su', 'S Electronics Co.', '02)667-7857', and '010-6676-7757', with the business card registration screen image to create data of a single image.

The mobile device 100 may create data by inputting 'Kim' and 'Cheol-Su', 'S Electronics Co.', '02)667-7857', and '010-6676-7757' in the fields of 'Name,' 'Company,' 'Telephone No' and 'Mobile Phone No.,' respectively. The mobile device 100 may create text data by performing the conversion with respect to 'Kim' and 'Cheol-Su', 'S Electronics Co.', '02)667-7857', and '010-6676-7757.'

Referring to FIG. 9C, the mobile device 100 also displays the created image data on the display unit 180. The mobile device 100 displays the text data, 'Kim' and 'Cheol-Su', 'S Electronics Co.', '02)667-7857', and '010-6676-7757,' in the fields of 'Name,' 'Company,' 'Telephone No' and 'Mobile Phone No.,' in the business card registration screen image, respectively.

Figure 10A:
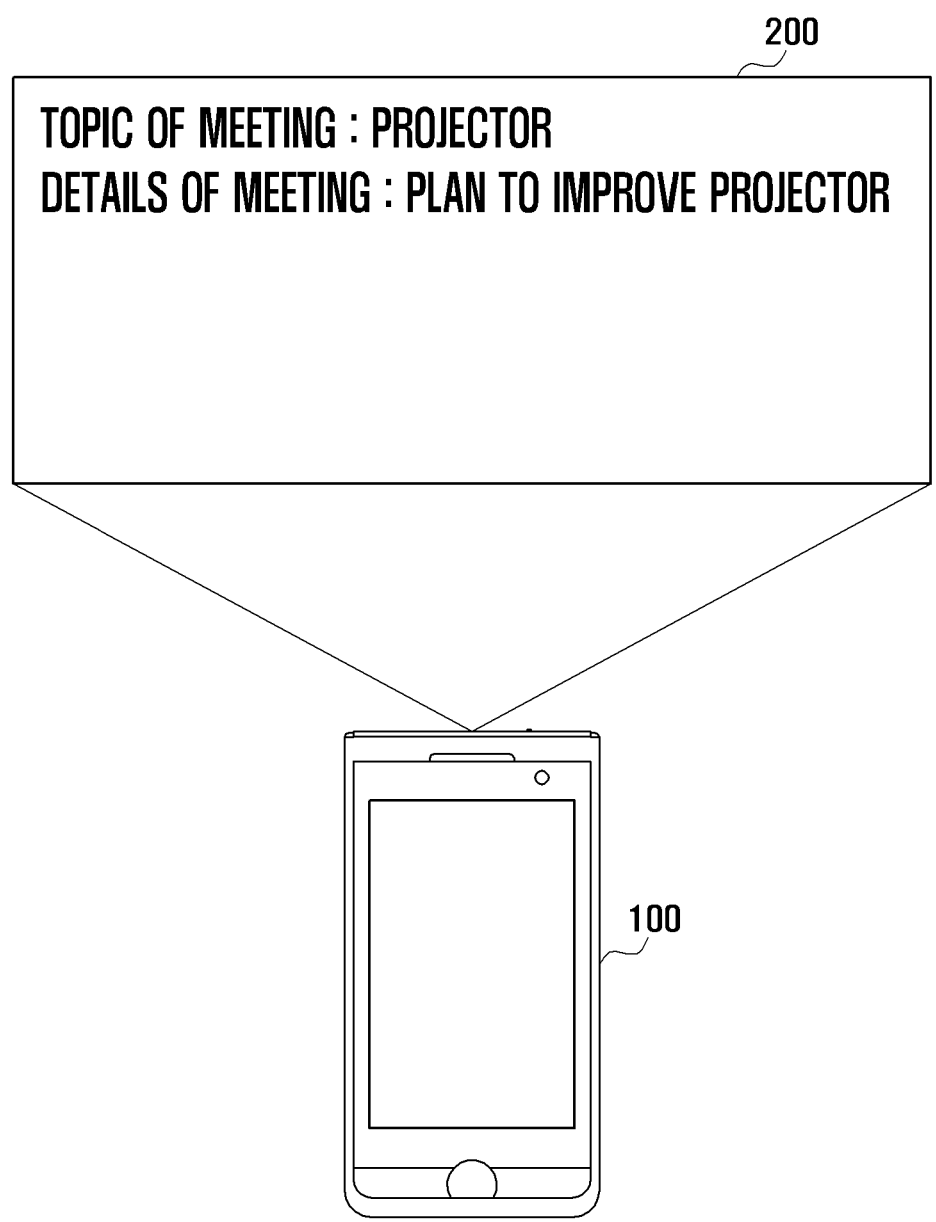
FIGS. 10A to 10C illustrate a screen and a mobile device that describes a third operation mode when a method creates data in a mobile device according to an exemplary embodiment of the present invention.
Figure 10B:
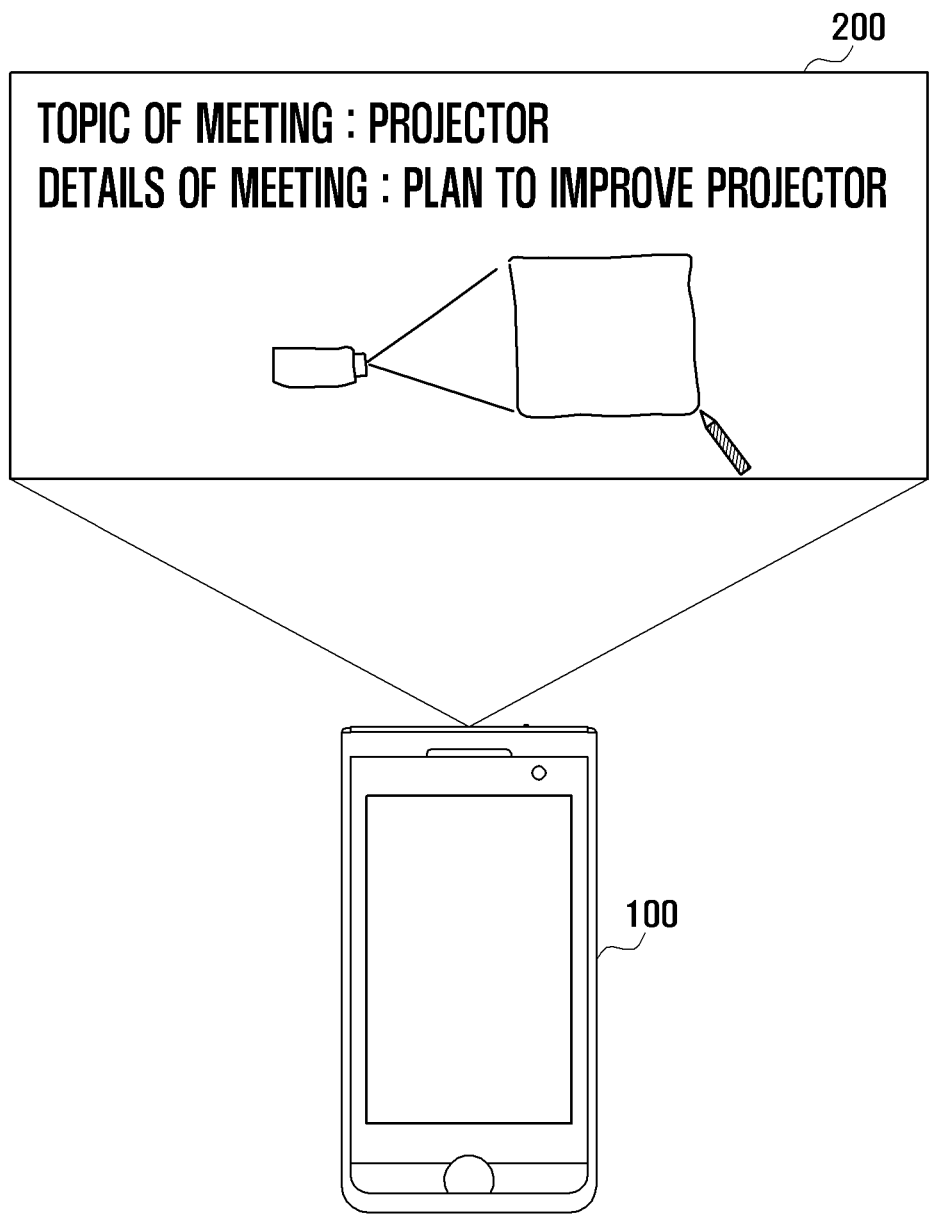
Figure 10C:
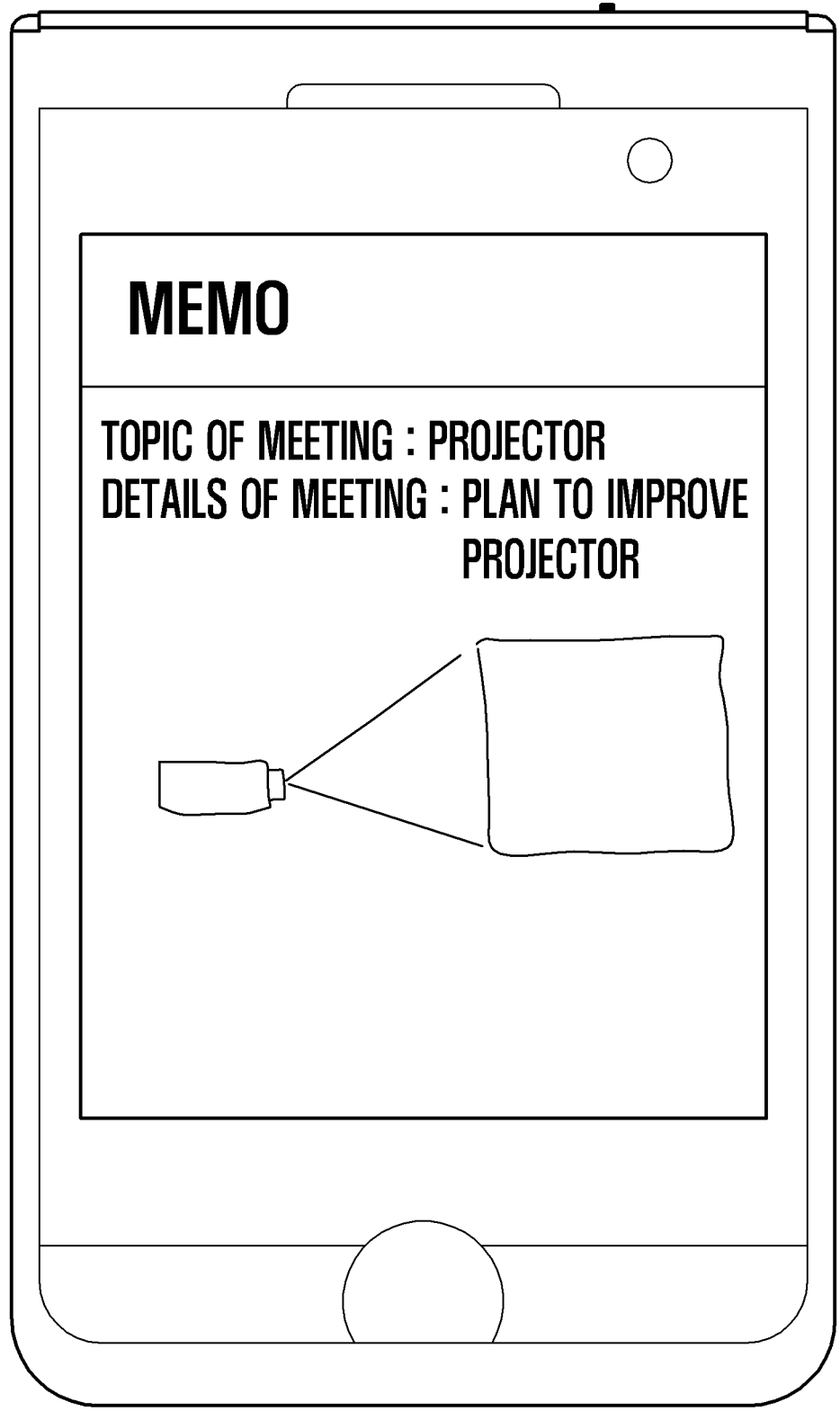

FIGS. 10A to 10C illustrate a screen and a mobile device that describes a third operation mode when a method creates data in a mobile device according to an exemplary embodiment of the present invention.

Referring to FIG. 10A, the mobile device 100 outputs a format image to an external screen 200 via the projector module 130. For example, the format image may be a memo input screen image when the mobile device 100 executes a memo function. The memo input image contains two text items 'Topic of Meeting: Projector' and 'Details of Meeting: Plan to improve projector', for example, and a blank space. The two text items may be edited as the user input text via the input unit 170. The mobile device 100 may also display the same image as the projector module 130 on the display unit 180.

Referring to FIG. 10B, when the mobile device 100 outputs the memo input screen image to an external screen 200 via the projector module 130, the user draws in the blank space with a writing tool. The mobile device 100 controls the camera module 140 to capture the external screen 200 on which the memo input screen image and the user's input content are being displayed, and creates a captured image. The mobile device 100 compares the original memo input screen image, output from the projector module 130 as shown in FIG. 10A, with the captured image, and detects the users input content as an added image. The mobile device 100 extracts the added image from the captured image.

Simultaneously, the mobile device 100 also detects the location of the user's drawing in the memo input screen image. The mobile device 100 detects the coordinate values corresponding to the pixels where the user's drawing occupy, from the pixels forming the memo input screen image, and identifies the location of the user's drawing. The mobile device 100 combines the extracted images with the memo input screen image to create data of a single image. The mobile device 100 may also create data by arranging the user's drawn drawing in the memo input screen image according to the detected location.

Referring to FIG. 10C, the mobile device 100 also displays the created data on the display unit 180, where the create data shows the text 'Topic of Meeting: Projector' and 'Details of Meeting: Plan to improve projector,' and the user's drawing below the text.

As described above, when the controller 190 creates data from the extracted image, it may also store location information about the extracted image in the storage unit 160. For example, when the controller 190 controls the projector module 130 to output a calendar image to the external screen 200, during the execution of the scheduler function, the user may write a schedule on the external screen. The controller 190 extracts the user's input schedule from the image created as the camera module 140 captures the external screen, and simultaneously detects location information about the user's schedule. The controller 190 identifies the date of the schedule via the location information and creates data matching the date with the schedule details. The controller 190 may control the short-range wireless communication unit 150 to transmit the created data to another external mobile device. When another external mobile device has stored the same format of the calendar image transmitted from the mobile device 100 and receives the created data transmitted from the mobile device 100, the external mobile device may record the schedule detains in a region of a corresponding date in its calendar image.

As described above, the mobile device outputs a content image, via a projector module, to an external screen on which a user may write or draw with a writing tool. When a user writes or draws on the external screen on which a content image is being displayed, the mobile device may create data from the user's input text or drawing and store it in the storage unit.

As described above, the data creating method according to an exemplary embodiment of the present invention may be implemented with program commands that can be conducted in various types of computers and recorded in computer-readable recording media. The computer-readable recording media contain program commands, data files, data structures, or the like, or a combination thereof. The program commands recorded in the recording media may be designed or configured to comply with an exemplary embodiment of the present invention or may be software well-known to a person of ordinary skill in the art.

The computer-readable recoding media includes hardware systems for storing and conducting program commands. Examples of the hardware systems are magnetic media such as a hard disk, floppy disk, a magnetic tape, optical media such as CD-ROM and Digital Video Disc (DVD), Magneto-Optical Media, such as floptical disk, ROM, RAM, flash memory, etc. The program commands include assembly language or machine code compiled by a complier and a higher level language interpreted by an interpreter. The hardware systems may be implemented with at least one software module.

As described above, a method and system according to an exemplary embodiment of the present invention can create data from drawings and/or text that a user directly inputs on an external screen showing an image.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for generating data in a mobile device, the method comprising:
    projecting an image, stored in the mobile device, to an external screen;
    capturing an image of the external screen on which the projected image is being displayed and creating a captured image;
    comparing the projected image with the captured image and extracting an added image from the captured image; and creating data from the extracted image, wherein the projected image comprises a number of areas to which coordinate values are assigned to, respectively, and wherein the extracting of the added image comprises: determining whether the captured image contains the added image; extracting, when the captured image contains the added image, the added image; detecting a coordinate value of a location where the extracted image is located in the projected image; and detecting an area corresponding to the detected coordinate value in the projected image.

2. The method of claim 1, wherein the captured image is created as a user inputs a capture command in the mobile device.

3. The method of claim 1, wherein the creating of the captured image is performed repeatedly and periodically.

4. The method of claim 1, wherein the projected image comprises a number of areas, at least one of which is blank.

5. The method of claim 1, wherein the extracting of the added image comprises:
    determining whether the captured image contains the added image;
    extracting, when the captured image contains the added image, the added image; and
    detecting a location about the extracted image in the projected image.

6. The method of claim 1, wherein the creating of the data comprises:
    converting the extracted image into text data.

7. The method of claim 5, wherein the creating of the data comprises:
   combining the extracted image with the projected image, according to the detected location.

8. The method of claim 1, wherein the creating of the data comprises: inputting the extracted image into the detected area of the projected image.

9. A mobile device comprising:
   a projector for projecting an image to an external screen;
   a camera for capturing the external screen on which the projected image is being displayed and creating a captured image;
   a processor configured to execute instructions for comparing the projected image with the captured image, for extracting an added image from the captured image, for creating data from the extracted image, wherein the processor determines whether the captured image contains the added image, detects a coordinate value of a location where the extracted image is located in the projected image, detects an area corresponding to the detected coordinate value in the projected image, extracts the added image, and inputs the added image in the detected area to create data.

10. The mobile device of claim 9, wherein the projector module outputs a format image comprising a number of areas to which coordinate values are assigned, respectively.

* * * * *